July 5, 1932.  L. W. MELCHER  1,866,263
CAR AXLE BEARING
Filed Oct. 12, 1927
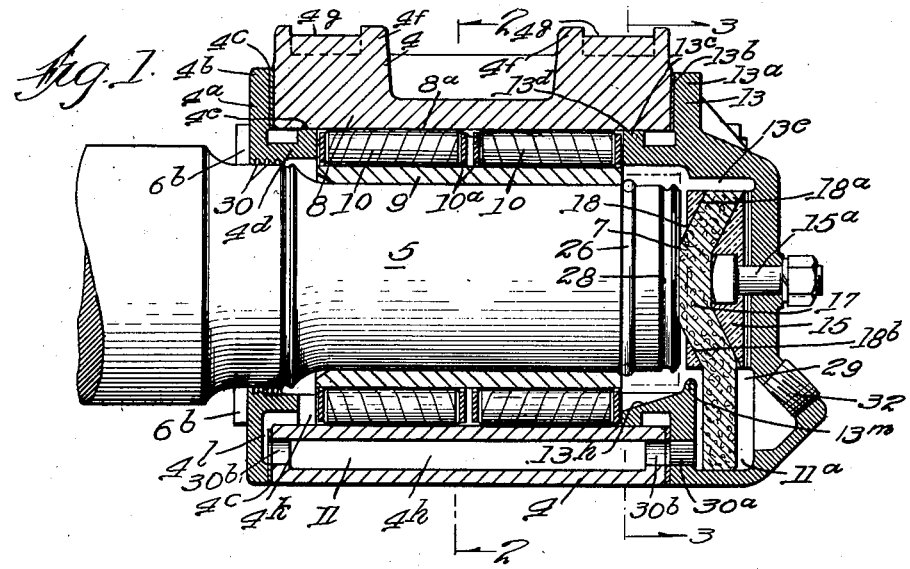
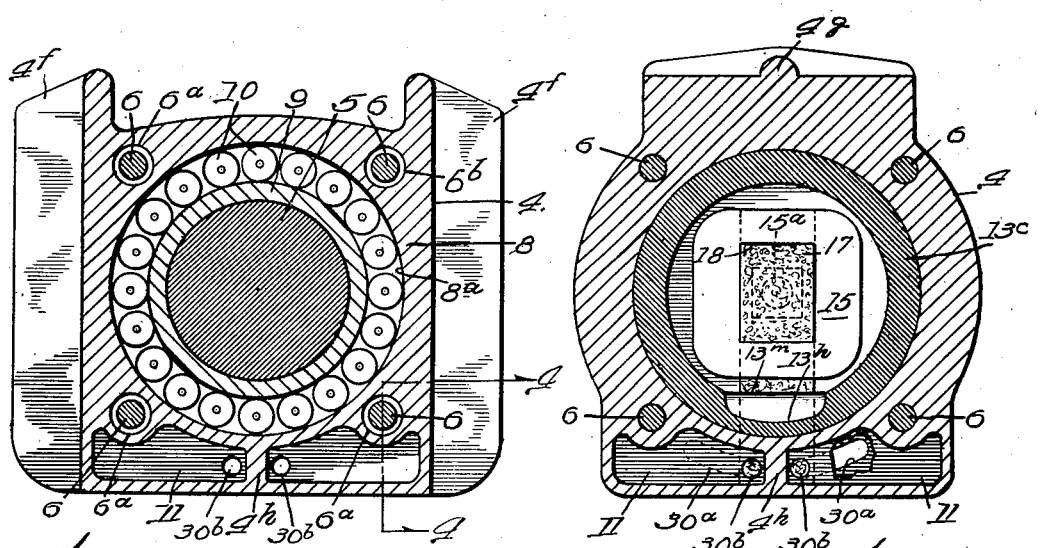
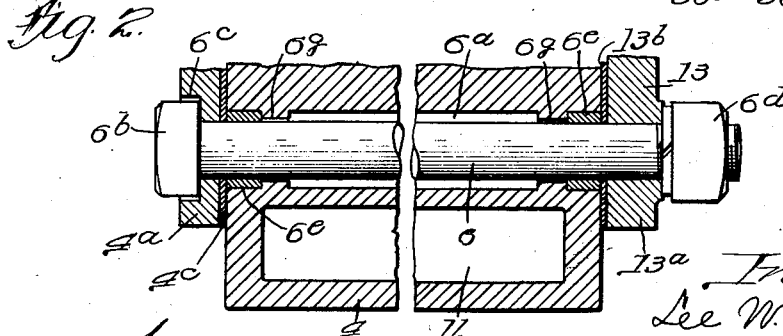

Patented July 5, 1932

1,866,263

UNITED STATES PATENT OFFICE

LEE W. MELCHER, OF WEST DE PERE, WISCONSIN, ASSIGNOR TO THE FAFNIR BEARING COMPANY, OF NEW BRITAIN, CONNECTICUT, A CORPORATION OF CONNECTICUT

CAR AXLE BEARING

Application filed October 12, 1927. Serial No. 225,769.

The invention relates to car axle bearings and more particularly to that type in which anti-friction rollers are interposed between the axle and the box.

In car axle bearings of this type, it is now common practice to insert in the box a cylindrical race or sleeve of hard metal to form the outer bearing surface for the rollers. The cost of producing these sleeves and fitting them in the box materially increases the cost of the finished product.

One object of the invention is to reduce the cost of bearings of this type, and this object is attained primarily by dispensing with the separately formed sleeve and forming the body of the box of hard metal, so that an integral portion thereof will serve as an outer bearing surface for the rollers.

Another object of the invention is to provide a box of this type in which the pedestal jaws or guides and the equalizer seats formed on the box are of hard metal to prevent wear thereof.

A further object of the invention is to provide a journal box for a car axle bearing, which is reversible end for end so that the outer pedestal guides may be shifted to the inside when the inner guides become worn due to the constant outward thrust of the box.

Other objects of the invention will be apparent from a consideration of the following detailed description.

The invention consists in the several novel features hereinafter set forth and more particularly defined by the claims at the conclusion hereof.

In the drawing: Fig. 1 is a longitudinal section of a car axle bearing embodying the invention, the axle being shown in elevation. Fig. 2 is a transverse section on the line 2—2 of Fig. 1. Fig. 3 is a transverse section on the line 3—3 of Fig. 1. Fig. 4 is a section through one of the bolts for securing the members of the box together.

The invention is exemplified in a structure comprising a box which is adapted to be guided in the truck pedestal and an axle 5 which extends into the box. The box comprises a body 4, a head or ring $4^a$ at the inner end of said body, and a cap 13 at the outer end of the body. The head $4^a$ and the cap 13 are separately formed from the body. The latter is formed of hard metal and comprises an integral cylindrical wall 8, on the inner face of which is formed a cyindrical bearing surface $8^a$. An inner race or sleeve 9 is shrunk and fixedly held on the axle 5. A locking ring 26 for the sleeve 9 is secured in a peripheral groove in the axle. Two annular series of bearing rollers 10, each confined in a suitable cage $10^a$, between the outer periphery of sleeve 9 and the bearing surface $8^a$, constitute a roller bearing for supporting the box from the axle. The cylindrical bearing surface $8^a$ extends longitudinally of the box and from end to end of the body 4. By forming the entire box body of hard metal, with bearing surface $8^a$ integral therewith, the necessity of a separate outer bearing sleeve is avoided. In the manufacture of the boxes, the bearing surface $8^a$ is ground so that it will be truly cylindrical and smooth to form a suitable bearing surface for the rollers.

The head $4^a$ comprises a flange $4^b$ which is adapted to fit against a gasket $4^c$ to form a tight joint between the box-body and the head, and an inwardly extending ring $4^d$ which extends inwardly into the box-body to form a retaining member for confining the rollers against inward longitudinal movement. The inner end $4^a$ of ring $4^d$ is cylindrical to fit the bearing surface $8^a$ in the box. The head $4^a$ is formed of ordinary or unhardened iron, so that it can be machined to fit in the box-body and so that it can be drilled for the retaining bolts. Grooves 30 for an oil and dust seal are formed in the head $4^a$ around the axle. The cap 13 is also formed of ordinary or unhardened metal and comprises a flange $13^a$, the inner face of which is machined to fit against a gasket $13^b$, and comprises a ring $13^c$ integrally formed therewith which extends into the box-body to retain the rollers against outward longitudinal movement. The inner portion $13^d$ of ring $13^c$ is cylindrical to fit the cylindrical bearing surface $8^a$ in the box-body. The cap 13 is provided with a recess $13^e$ in which is secured, by a bolt 15ª, a thrust block 15. Being formed of ordinary metal, such as iron, the cap can be readily machined to fit the box, and drilled for the bolt 15ª, and the bolts for removably securing the cap to the box-body. The box-body, head 4ª and cap 13 are secured together by bolts 6. These bolts extend longitudinally through holes 6ª formed in the box-body, through the head 4ª and through the cap 13. The heads 6ᵇ of the bolts 6 are seated in pockets 6ᶜ formed in the head 4ª. Nuts 6ᵈ threaded to the outer ends of the bolts are adapted to securely clamp the head 4ª, gasket 4ᶜ, body 4, gasket 13ᵇ, and the cap 13, together. Since the body 4 is formed of hard metal which cannot be machined, the holes 6ª are formed by cores, and the outer ends of these holes are lined, as at 6ᵉ, with suitable material, such as babbitt or lead, which can be bored to accurately position the bolts in the body, to insure co-relative positioning of the box-body and its associated parts. Shoulders 6ᵍ are cast in the box-body, and the soft metal linings 6ᵉ extend between these shoulders and the ends of the body.

This exemplifies a car axle bearing in which the body of the box is formed of hard metal and with an integral outer bearing surface for the rollers, and the head and cap, for closing the inner and outer ends of the box, are formed of machinable metal. As a result of this, the necessity of providing a separate hard metal bushing to form an outer bearing surface for the rollers, is avoided.

The box-body comprises vertical flanges 4ᶠ which are integrally formed with the box body and form pedestal guides. By forming these integral with the box-body of hard metal, wear thereof by the pedestal will be avoided. By forming the bearing surface 8ª so that it extends completely through the box and is of uniform diameter from one end to the other, the box may be reversed readily, simply by withdrawing the bolts 6 to disconnect the head 4ª and the cap 13, and then shifting the box-body 4 end for end and securing the head and cap again in place and to the opposite ends of said box-body. A characteristic and advantage of providing a construction wherein the box-body may be reversed is that the outer pedestal guides may be shifted to the inside when the inner guides become worn due to the constant outward thrust of the box-body, it being understood that the pressure exerted upon the journal box is at substantially all times toward the end of the axle. Equalizer seats 4ᵍ are also integrally formed with the box-body of hard metal, so that they too will resist wear. These seats are positioned equidistantly from the central portion of the box so that reversal will not result in longitudinal displacement of said box. Thus, the invention exemplifies a car axle box which is reversible end for end to compensate for wear of the pedestal guides and double the life of the box and in which the pedestal guides or jaws and the equalizer seats are integral with the box and are formed of hard metal to resist wear.

The box has an oil well 11 formed in its lower portion and this well extends from one end of the box to the other and at both sides of a vertical rib 4ʰ which joins the bottom of the box and the lower portion of wall 8. Thrust block 15, which is usually formed of brass, is normally spaced away from the end face 7 of the axle. This block carries a vertically extending wick 17 and has its inner face formed with an opening 18 to expose a portion of the wick adjacent the central portion of the face 7 of the axle to apply lubricant thereto. From the opening 18, the wick extends through oblique recesses 18ª and 18ᵇ in the block so that it will be held therein. The wick applies oil to the central portion of the end face of the axle, and the oil is thrown outwardly by centrifugal force. An annular groove 28 is formed in the axle adjacent its end face to arrest the oil against longitudinal inward movement on the axle. The lower end of the wick extends into the well 11 to continuously feed oil by capillary attraction to the axle. The annular wall 13ᶜ of the cap 13 extends around the end face of the axle to catch the oil thrown outwardly by centrifugal force, and has a recess 13ʰ in its lower portion to conduct the oil from the axle to the outer end of the space in which the rollers 10 travel. A rib 13ᵐ is formed to direct the oil to the recess 13ʰ. The wick extends through a vertical opening 29 in the cap, so its lower end will be submerged in the portion 11ª of the oil well which is formed in the cap and which communicates by a pair of ducts with the well in the box-body. Each of the aforesaid ducts comprises an arcuate slot 30ª which is formed in the bottom part of the cap 13 and a cylindrical aperture 30ᵇ which is formed in the body 4 and registers with the inner end of the slot. The oil fed to the rollers and their bearing surfaces from recess 13ʰ, besides being carried around the bearing surfaces by the rollers, works its way longitudinally to the inner end of the box. A duct 4ᵏ is formed in the wall 4ᶜ of the head 4 to permit the oil to pass from the inner end of the bearing-surfaces to a channel 4ˡ which communicates with the inner end of the oil well 11 through the apertures 30ᵇ. In operation, this lubricating means will continuously supply oil in limited quantity from the well to the end face 7 of the axle which will throw the oil outwardly in the cap. The oil thus thrown will pass to the bearing to lubricate the rollers and bearing surfaces, and after working its way to the inner end of the bearing will be returned to the oil well 11. The wick 17, besides feeding the oil to the axle by capillary attraction, filters it. By having apertures 30ᵇ in both ends of the box-body and forming the cap 13 in the manner herein disclosed, the wick may be associated with either end of the box. This feature tends to facilitate assembly for the reason that the lubricating means is operative regardless of the position of the box-body and without drilling holes or other such additional steps. A filler plug 32 is screw-threaded into the cap 13.

The invention exemplifies a car axle bearing of the roller type in which the outer cylindrical bearing surface for the rollers is integrally formed or cast with the box-body made of hard metal to dispense with the necessity of a separate bearing sleeve, and in which the box ends are formed of machinable metal, so that the structure can be produced at a low cost; also a bearing of this type in which the pedestal guides and equalizer seats are formed of wear-resisting metal; also a bearing of this type in which provision is made for efficient lubrication of the rollers and the bearing surfaces.

The invention is not to be understood as restricted to the details set forth since these may be modified within the scope of the appended claims, without departing from the spirit and scope of the invention.

Having thus described the invention, what I claim as new and desire to secure by Letters Patent, is:

1. In a car axle bearing, the combination of a box body of hard metal having integrally cast therein a cylindrical bearing surface, members of machinable metal for closing the ends of the box respectively, the box-body having holes extending longitudinally therethrough, soft metal linings in the holes, bolts extending through said holes and the members to clamp said body and members together, an axle extending through one of the members and into the box, and a series of bearing rollers around the axle and engaging said cylindrical bearing surface.

2. In a car axle bearing, the combination of a box-body of hard metal having a cylindrical bearing surface integrally cast therein, a cap of machinable metal for closing the outer end of the body, having an annular wall extending into one end of the body, an axle extending into the box, a series of bearing rollers around the axle and engaging the bearing surface in the body, a wick carried in the cap for feeding oil to the end of the axle, the annular wall of the cap being formed to direct oil to one end of the bearing surface, a head of machinable metal for closing the inner end of the body, and means to conduct the oil from the inner end of the bearing to the oil-well.

3. In a car axle bearing, the combination of a box-body of hard metal, said body embodying an oil well in the lower part thereof and having a cylindrical bearing surface integrally cast therein, a cap of machinable metal for closing the outer end of the body, having an annular wall extending into one end of the body, an axle extending into the box, a series of bearing rollers around the axle and engaging the bearing surface in the body, a wick carried in the cap for feeding oil from the well to the end of the axle, the annular wall of the cap being formed to direct oil to the outer end of the bearing surface, and a head for closing the inner end of the body provided with an annular wall extending into the inner end of the box, having a passage to conduct oil from the inner end of the bearing to the oil well.

4. In a car axle bearing, the combination of a box-body having a cylindrical bearing surface formed therein and extending from one end thereof to the other end, members for closing the ends of the box respectively, an axle extending through one of the members and into the box, and a series of bearing rollers around the axle and engaging said cylindrical bearing surface, said members having walls extending into the ends of the box embodying radially enlarged portions shaped to fit against the bearing surface and operative to confine the rollers against movement toward the ends of the box-body.

5. In a car axle bearing, the combination of a box-body having a cylindrical bearing surface formed therein and extending from one end thereof to the other end, said box having an oil well formed in its lower portion beneath said bearing surface, a cap for closing the outer end of the box-body, provided at the inner lower portion thereof with an upwardly extending wall, said wall forming a chamber with the continuous parts of the cap and embodying an opening for conducting oil from the well into said chamber, an axle extending through the inner end of and into said body, rollers between the axle and bearing surface, and means for feeding oil from the chamber to said rollers and the associated parts.

6. In a car axle bearing, the combination of a box-body having a cylindrical bearing surface formed therein and extending from one end thereof to the other end, said box having an oil well formed in its lower portion beneath said bearing surface, a cap for closing the outer end of the box-body, provided at the inner lower portion thereof with an upwardly extending wall, said wall forming a chamber with the continuous parts of the cap and embodying an opening for conducting oil from the well into said chamber, an axle extending through the inner end of and into said body, rollers between the axle and bearing surface, and an oil feeding wick carried by the cap and having one end thereof disposed in the chamber.

7. In a car axle bearing, the combination of a box-body having a cylindrical bearing surface formed therein and extending from one end thereof to the other end, said box having an oil well formed in its lower portion beneath said bearing surface, a cap for closing the outer end of the box-body, having a chamber formed in the lower portion thereof, means integral with the cap and body respectively forming a duct for conveying oil from the well into said chamber, an axle extending through the inner end of and into the box-body, and a wick carried by the cap for feeding oil from the chamber to the end of the axle.

8. In a car axle bearing, the combination of a box-body having a cylindrical bearing surface formed therein and extending from one end thereof to the other end, said box-body having an oil well formed in its lower portion beneath said bearing surface, a cap for closing the outer end of the body, a head for closing the inner end of said body, an axle extending through the head and into the body, a series of bearing rollers around the axle and engaging the bearing surface in the body, means for feeding oil from the well to the end of the axle, and an annular inwardly extending wall formed integrally with the head and shaped to fit against the bearing surface, the lowermost portion of said wall having a passage for conducting oil from the inner end of the bearing surface to the oil well.

Signed at De Pere, Wisconsin, this 12th day of September, 1927.

LEE W. MELCHER.